(12) United States Patent
Sugiura

(10) Patent No.: US 8,281,891 B2
(45) Date of Patent: Oct. 9, 2012

(54) FOUR WHEEL DRIVE VEHICLE

(75) Inventor: Toshikazu Sugiura, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 492 days.

(21) Appl. No.: 12/690,214

(22) Filed: Jan. 20, 2010

(65) Prior Publication Data

US 2010/0181134 A1    Jul. 22, 2010

(30) Foreign Application Priority Data

Jan. 20, 2009    (JP) ................................. 2009-009913

(51) Int. Cl.
     *B62K 5/02*      (2006.01)
(52) U.S. Cl. ........... 180/251; 180/292; 180/376; 474/14
(58) Field of Classification Search .......... 180/251, 180/292, 376, 233; 474/14, 15, 16, 17
See application file for complete search history.

(56) References Cited

U.S. PATENT DOCUMENTS

| 5,515,940 | A | * | 5/1996 | Shichinohe et al. | .......... 180/376 |
| 6,076,624 | A | | 6/2000 | Izumi et al. | |
| 6,811,504 | B2 | * | 11/2004 | Korenjak et al. | .............. 474/14 |
| 6,896,087 | B2 | * | 5/2005 | Korenjak et al. | ............. 180/292 |
| 7,240,758 | B2 | * | 7/2007 | Korenjak et al. | ............. 180/292 |

FOREIGN PATENT DOCUMENTS

JP      10-297294 A      11/1998

* cited by examiner

*Primary Examiner* — Tony Winner
(74) *Attorney, Agent, or Firm* — Keating & Bennett, LLP

(57) ABSTRACT

A four-wheel drive vehicle includes a crankshaft that obtains the power of the engine. The rotation driving force of the crankshaft is transmitted to a secondary shaft through a belt type continuously variable transmission. The rotation driving force of the secondary shaft is transmitted to a rear wheel by a second drive shaft. A cam chain is arranged between the crank web of the crankshaft and the driving pulley of the belt type continuously variable transmission. The second drive shaft is arranged between the crank web and the driving pulley and under the cam chain. The second drive shaft is arranged to at least partly overlap the rotation trajectory C1 of the driving pulley when seen in a side view.

9 Claims, 8 Drawing Sheets

FOUR WHEEL DRIVE VEHICLE

BACKGROUND OF THE INVENTION

1. Field of the Invention

The present invention relates to four-wheel drive vehicles, and more specifically to a four-wheel drive vehicle that transmits engine power to front and rear wheels through a belt type continuously variable transmission.

2. Description of the Related Art

There is a known four-wheel drive vehicle that transmits engine power through a belt type continuously variable transmission. The four-wheel drive vehicle disclosed by JP H10-297294 A is provided with a belt type continuously variable transmission at an end of a crankshaft.

In the four-wheel drive vehicle disclosed by JP H10-297294 A, a centrifugal clutch is provided between a crank web and the belt type continuously variable transmission. The drive shaft is arranged to pass under the centrifugal clutch. The centrifugal clutch is a relatively large component in a transmission unit. In the four-wheel drive vehicle disclosed by JP H10-297294 A, the drive shaft is arranged apart from and under the crankshaft. As the distance between the drive shaft and the crankshaft increases, the size of the transmission unit increases.

In the four-wheel drive vehicle, a seat is provided above the engine and the transmission unit. When the size of the transmission unit increases, the space for the driver's seat is reduced in a four-wheel drive vehicle such as an SSV (Side by Side Vehicle).

SUMMARY OF THE INVENTION

A four-wheel drive vehicle according to a preferred embodiment of the present invention preferably includes a two-cylinder engine and a front wheel and a rear wheel arranged to rotate with the driving force of the engine. The four-wheel drive vehicle includes a crankshaft, a secondary shaft, a belt type continuously variable transmission, a cam chain, and a drive shaft. The crankshaft is arranged in the widthwise direction of the vehicle to obtain the driving force of the engine. The secondary shaft is arranged parallel or substantially parallel to the crankshaft. The belt type continuously variable transmission is arranged to couple one axial end of the crankshaft and one axial end of the secondary shaft and to transmit the rotation of the crankshaft to the secondary shaft. The cam chain is arranged between the crank web of the crankshaft and the belt type continuously variable transmission. The drive shaft is arranged under the cam chain. The drive shaft at least partly overlaps the pulley of the belt-type continuously variable transmission when seen in the axial direction of the crankshaft. The drive shaft transmits the rotation of the secondary shaft to the front wheel and the rear wheel.

In the four-wheel drive vehicle according to a preferred embodiment of the present invention, the drive shaft can be arranged near the crankshaft. More specifically, the drive shaft can be arranged in the space between the crank web and the belt type continuously variable transmission and under the cam chain. As a result, the sizes of the engine and the transmission unit in the vertical direction can be reduced. The sizes of the engine and the transmission unit in the vertical direction are reduced so that a large space can be secured for a driver's seat in the four-wheel drive vehicle.

Accordingly, a preferred embodiment of the present invention provides a four-wheel drive vehicle including a compact drive device that includes an engine, a transmission unit, and a drive shaft.

Other features, elements, steps, characteristics and advantages of the present invention will become more apparent from the following detailed description of the preferred embodiments of the present invention with reference to the attached drawings.

DETAILED DESCRIPTION OF THE PREFERRED EMBODIMENTS

Preferred embodiments of the present invention will be described in conjunction with the accompanying drawings.

Figure 1:
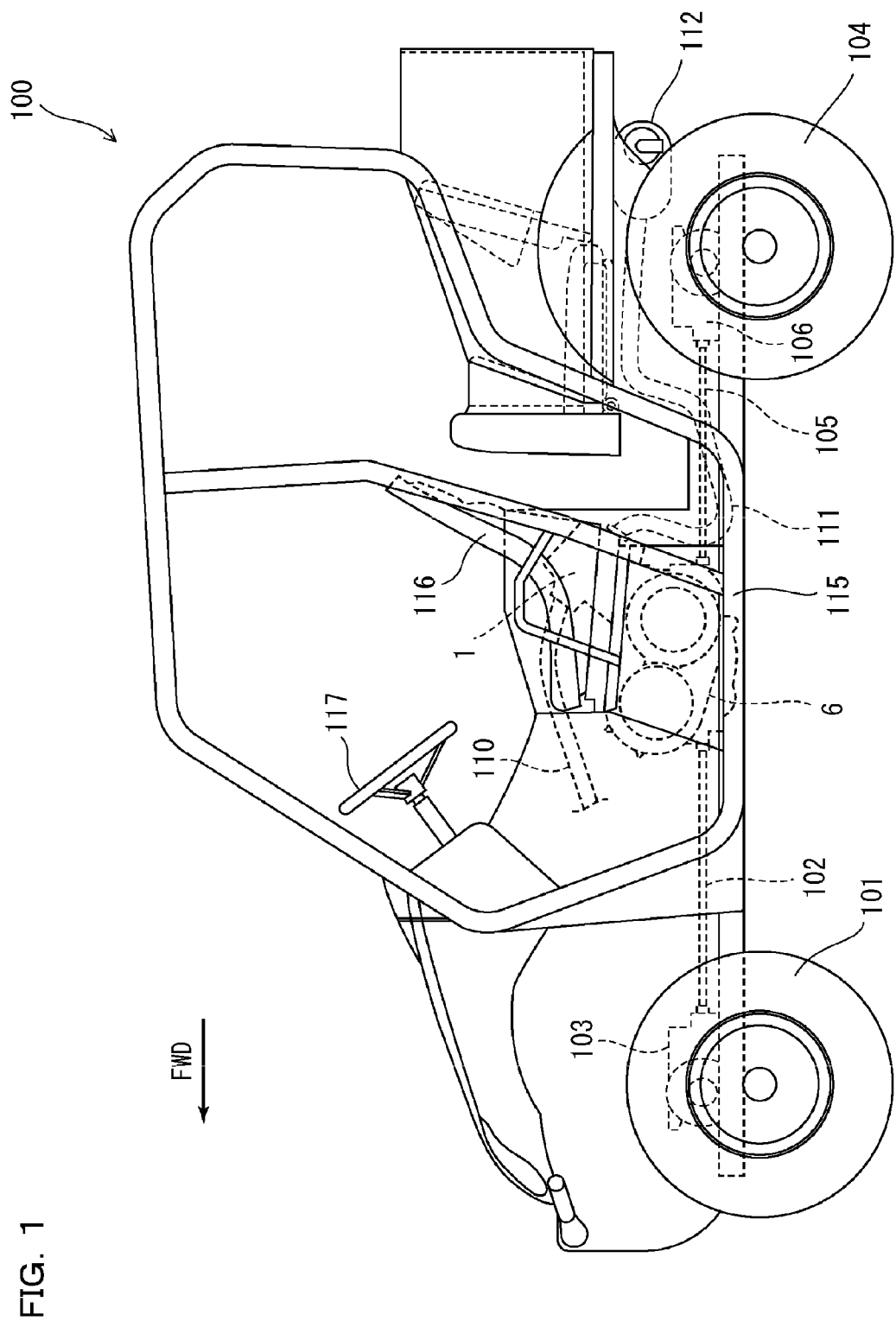
FIG. 1 is a left side view of a four-wheel drive vehicle according to a preferred embodiment of the present invention.

FIG. 1 is a left side view of a four-wheel drive vehicle 100 according to a preferred embodiment of the present invention. The four-wheel drive vehicle 100 preferably is a vehicle called "SSV" (Side by Side Vehicle) capable of off-road traveling. The SSV is a vehicle preferably including two front seats.

In the drawings, the arrow FWD indicates the forward advancing direction of the four-wheel drive vehicle 100. In the following description, the front-back direction and the right-left direction refers to these directions with respect to the advancing direction of the vehicle unless otherwise specified. More specifically, the front direction seen from a driver on a seat is the front direction of the four-wheel drive vehicle 100, and the right-left direction seen from the driver on the seat is the right-left direction of the four-wheel drive vehicle 100. The vehicle widthwise direction is the same as the right-left direction.

As shown in FIG. 1, the four-wheel drive vehicle 100 has an engine 1 near a center of the vehicle. A seat 116 is arranged above the engine 1. A steering mechanism 117 is provided in front of the seat 116. A frame 115 is attached to cover the space for the driving seat including the seat 116 and the steering mechanism 117.

A transmission unit 6 is arranged under the engine 1. A front drive shaft 102 extends forward from the transmission unit 6. The power of the engine 1 is transmitted to a front wheel 101 through a front drive shaft 102. A rear drive shaft 105 extends backward from the transmission unit 6. The power of the engine 1 is transmitted to a rear wheel 104 through the rear drive shaft 105.

An intake pipe 110 is connected to a front portion of the engine 1. The intake pipe 110 takes in air from an outside through an air cleaner that is not shown. An exhaust pipe 111 is connected to a rear portion of the engine 1. The exhaust pipe 111 extends toward a back of the vehicle. A muffler 112 is attached to a rear end of the exhaust pipe 111.

Figure 2:
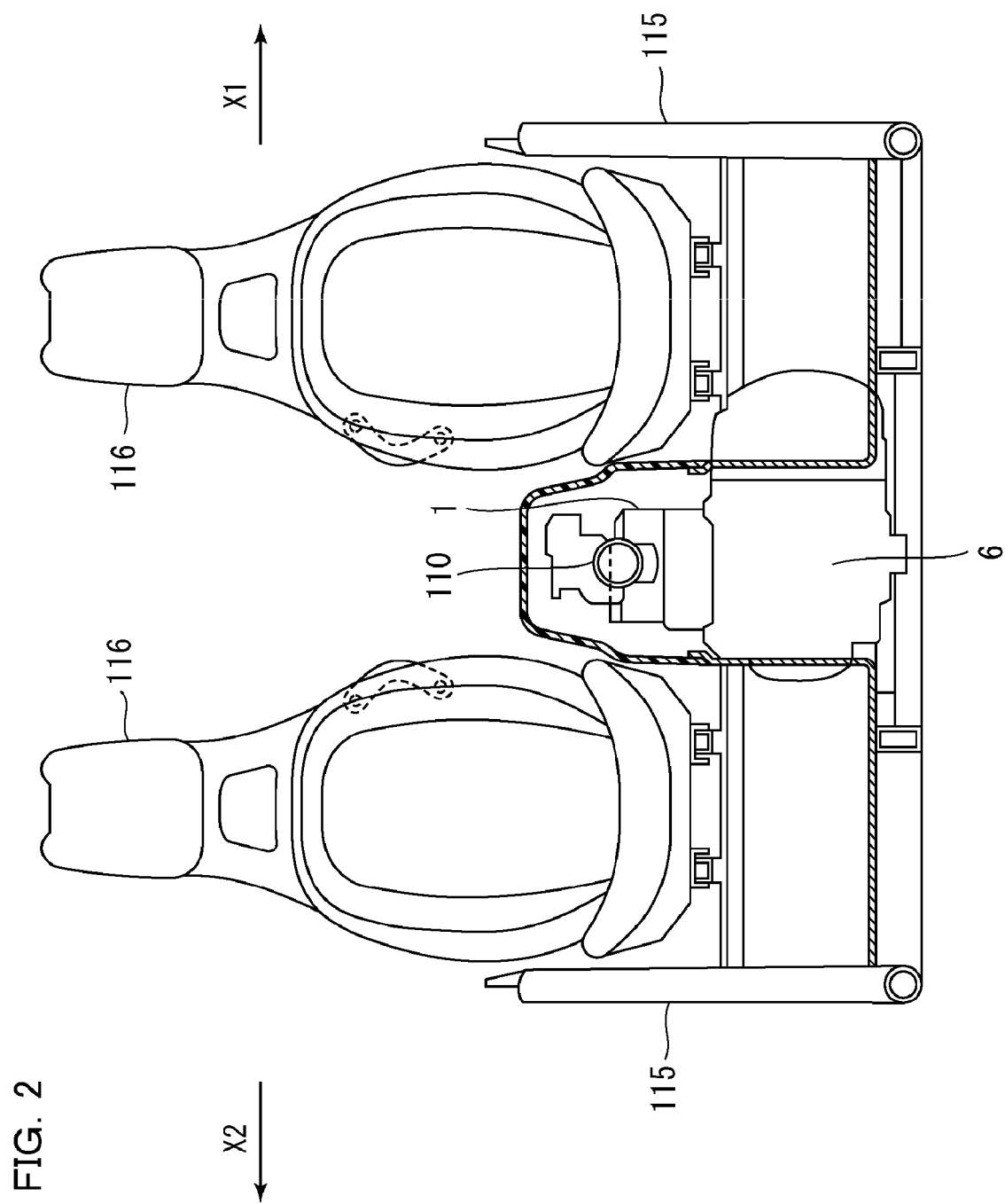
FIG. 2 is a front view of a periphery of a driver's seat.

FIG. 2 is a front view of a periphery of the driver's seat. In FIG. 2, the direction of the arrow X1 indicates the left of the vehicle and the direction of the arrow X2 indicates the right of the vehicle. As shown in FIG. 2, a pair of left and right seats 116 is arranged in a space of the driver's seat. The engine 1 is arranged under a space between the pair of the left and right seats 116. The transmission unit 6 is arranged under the engine 1.

Figure 3:
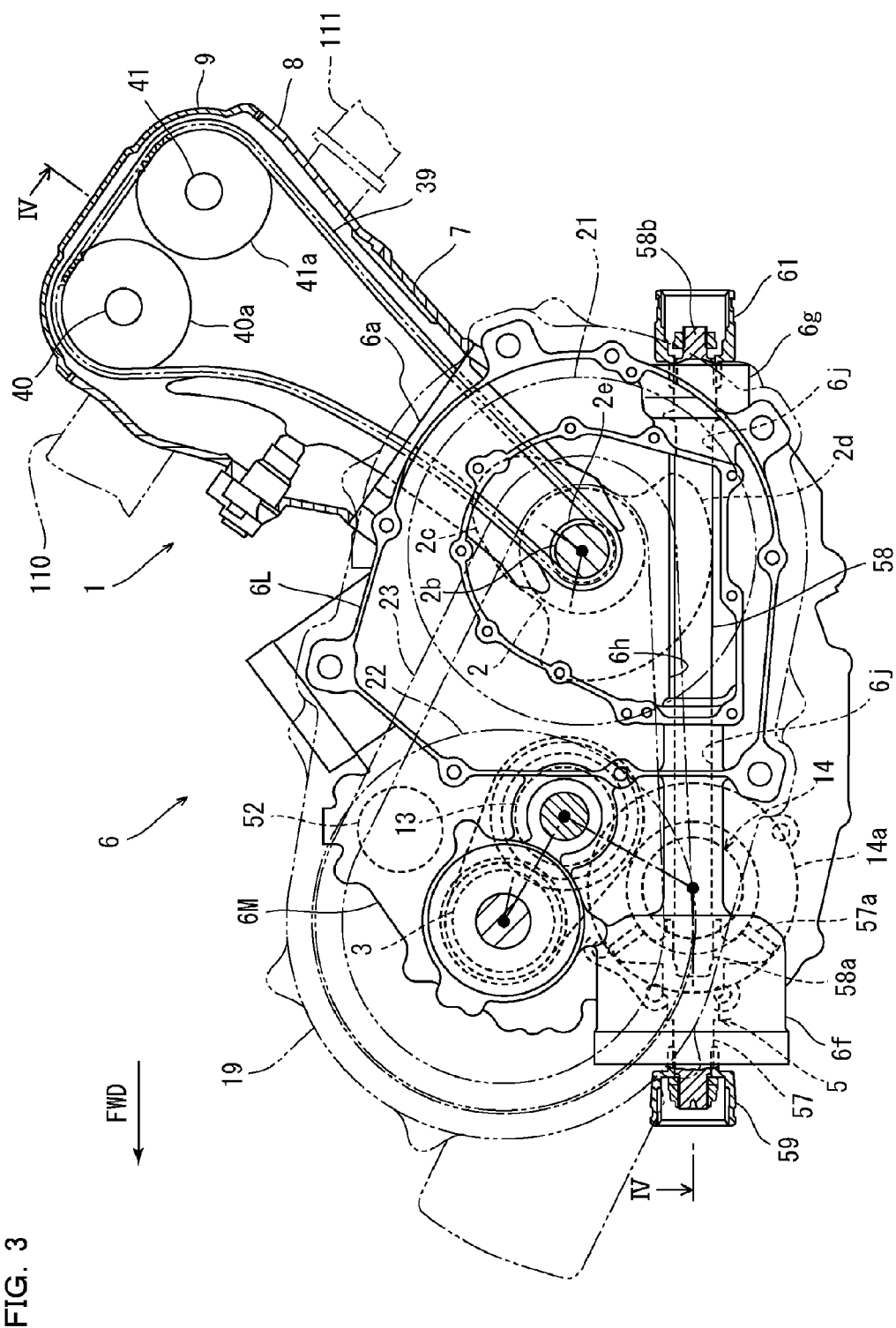
FIG. 3 is a left side view of an engine and a transmission unit in the four-wheel drive vehicle.

FIG. 3 is a left side view of the engine 1 and the transmission unit 6 in the four-wheel drive vehicle 100. The engine 1 preferably is a water cooling type, 4-cycle parallel-two cylinder engine. The cylinder body and the cylinder head of the engine 1 are arranged so as to be inclined backward and obliquely upward.

The transmission unit 6 is arranged under the engine 1. The transmission unit 6 includes a crankshaft 2 and a secondary shaft 3. The crankshaft 2 and the secondary shaft 3 are arranged parallel or substantially parallel to each other. The crankshaft and the secondary shaft 3 are arranged in the right-left direction. In other words, the crankshaft 2 and the secondary shaft are arranged in the vehicle widthwise direction perpendicular or substantially perpendicular to the advancing direction of the vehicle.

A drive shaft 5 is arranged under the crankshaft 2 and the secondary shaft 3. The drive shaft 5 includes a first drive shaft 57 and a second drive shaft 58. The second drive shaft 58 is arranged in the front-back direction of the vehicle. The crankshaft 2 and the second drive shaft 58 are arranged perpendicular or substantially perpendicular to each other.

Figure 4:
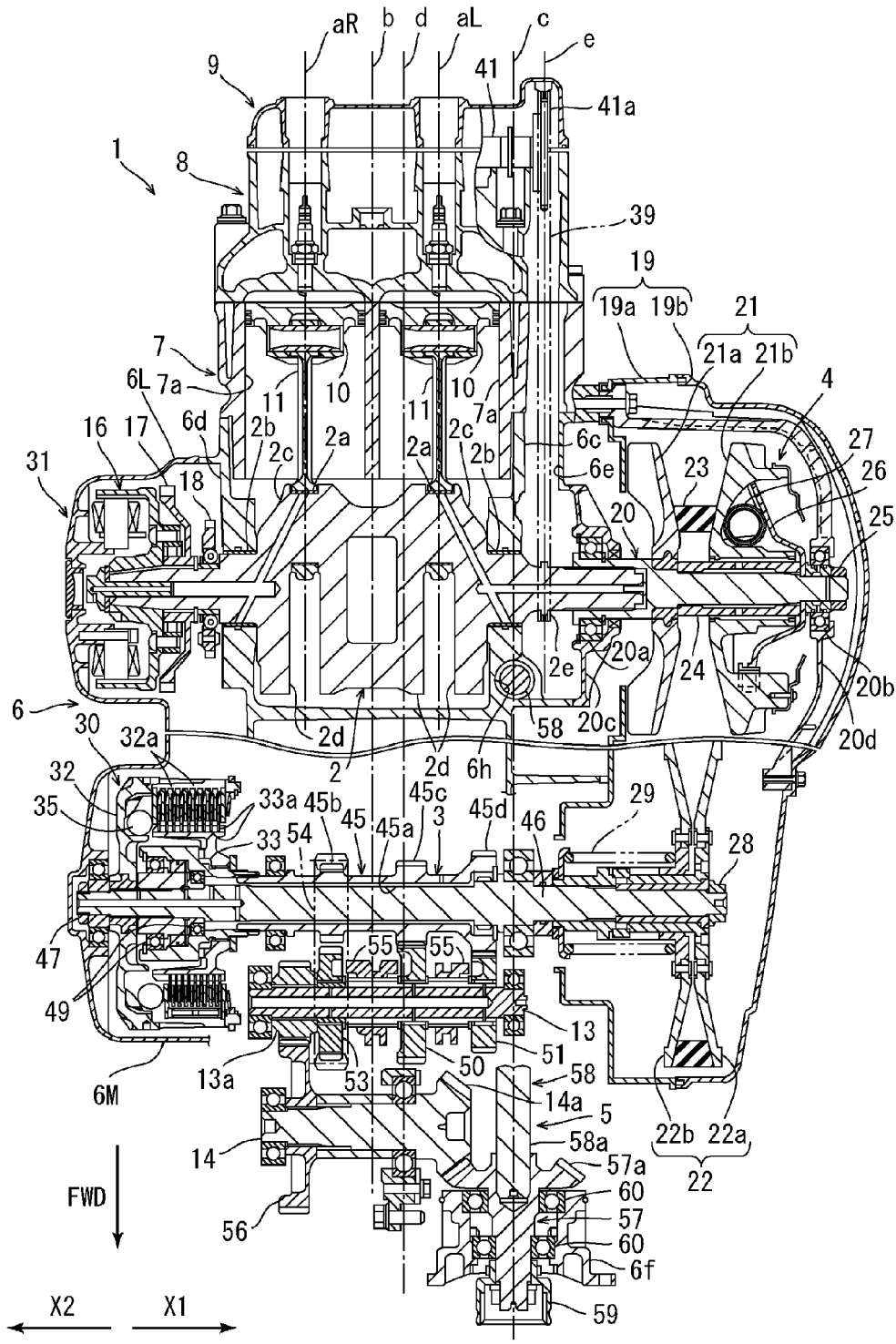
FIG. 4 is a developed sectional view (section taken along line IV-IV in FIG. 3) of the engine and the transmission unit.

FIG. 4 is a developed sectional view of the engine 1 and the transmission unit 6. FIG. 4 is a developed sectional view taken along line IV-IV in FIG. 3. The line IV-IV is a line connecting the crankshaft 2, the secondary shaft 3, a shift shaft 13, and an output shaft 14 in the mentioned order. As shown in FIG. 4, the crankshaft 2 and the secondary shaft 3 are arranged parallel or substantially parallel to each other. In FIG. 4, the direction of the arrow X1 indicates the left side of the vehicle and the direction of the arrow X2 indicates the right side of the vehicle.

A belt type continuously variable transmission 4 is arranged at one end of the transmission unit 6. The belt type continuously variable transmission 4 transmits the rotation driving force of the crankshaft 2 to the secondary shaft 3. When the rotation driving force of the crankshaft 2 is transmitted to the secondary shaft 3, the rotation speed of the secondary shaft 3 is shifted continuously by the belt type continuously variable transmission 4.

The drive shaft 5 is arranged under the crankshaft 2 and the secondary shaft 3. The drive shaft 5 is arranged perpendicular or substantially perpendicular to the crankshaft 2 and the secondary shaft 3. The drive shaft 5 extends in the front-back direction of the vehicle. The drive shaft 5 transmits the rotation driving force of the secondary shaft 3 to the front wheel 101 and the rear wheel 104.

The transmission unit 6 includes the shift shaft 13 arranged parallel or substantially parallel to the crankshaft 2. The transmission unit 6 further includes the output shaft 14 arranged parallel or substantially parallel to the shift shaft 13. The crankshaft 2, the secondary shaft 3, the shift shaft 13, and the output shaft 14 are positioned parallel or substantially parallel to one another.

As shown in FIG. 3, the shift shaft 13 is arranged between the crankshaft 2 and the secondary shaft 3. The output shaft 14 is arranged in front of and under the shift shaft 13. The shift shaft 13 changes the rotation speed of the secondary shaft 3 between high and low modes. Alternatively, the shift shaft 13 switches the rotation direction of the secondary shaft 13 to the reverse direction. The output shaft 14 transmits the rotation driving force of the shift shaft 13 to the drive shaft 5.

Figure 5:
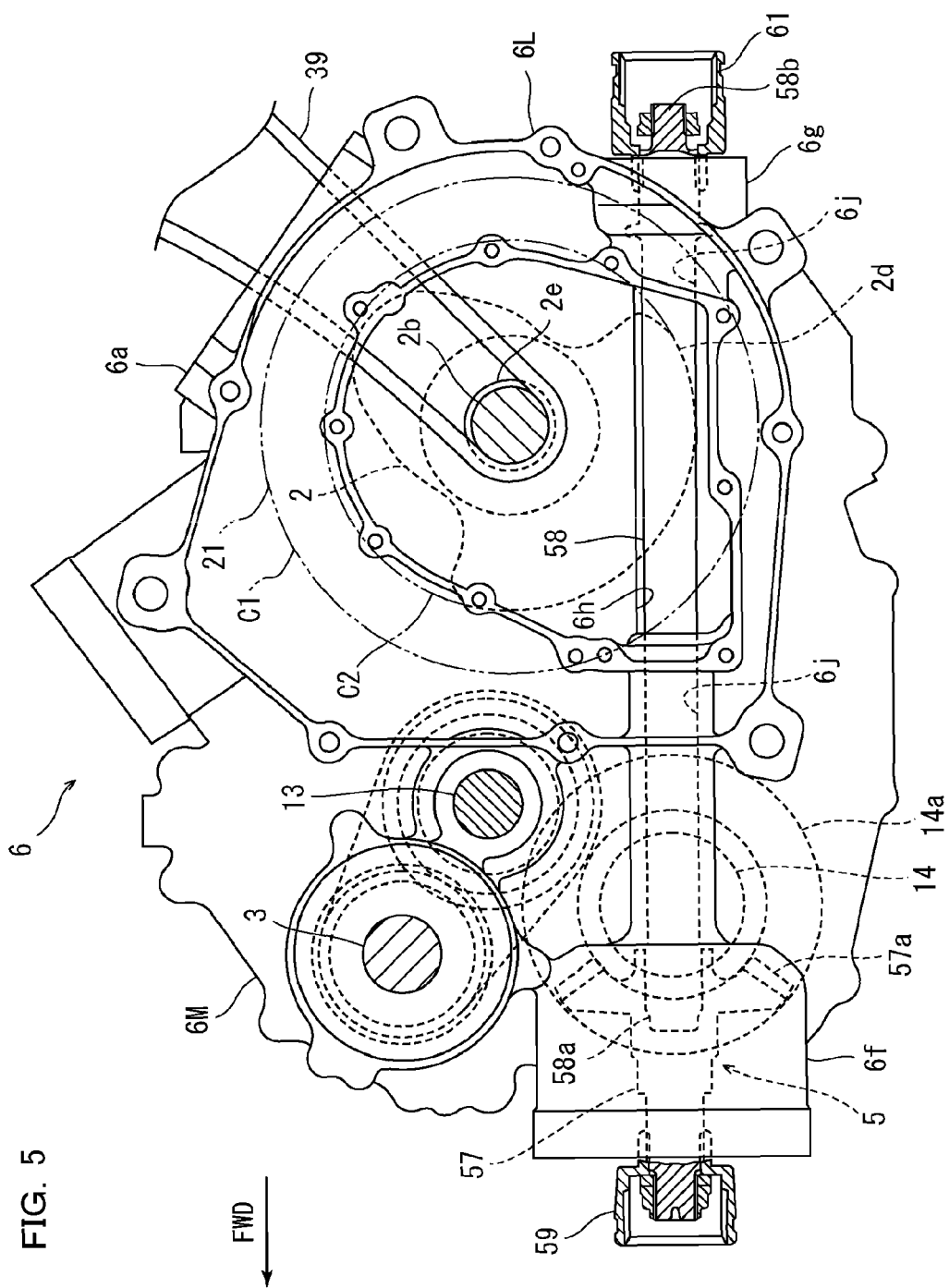
FIG. 5 is a left side view showing a positional relation among the engine, the transmission unit, and a drive shaft.

FIG. 5 is a side view of a positional relation among the engine 1, the transmission unit 6, and the drive shaft 5.

As shown in FIG. 5, the transmission unit 6 has a crankcase 6L that stores the crankshaft 2. The transmission unit 6 has a case 6M that stores the secondary shaft 3, the shift shaft 13, and the output shaft 14. The crankcase 6L and the case 6M are divided to left and right portions in the crankshaft direction. A junction surface 6a is formed on the crankcase 6L.

As shown in FIG. 3, a cylinder block 7 is coupled to an upper portion of the junction surface 6a. A cylinder head 8 is coupled to an upper portion of the cylinder block 7. Furthermore, a head cover 9 is mounted on the cylinder head 8. An intake pipe 110 is connected to a front wall of the cylinder head 8 and an exhaust pipe 111 is connected to a rear wall.

As shown in FIG. 4, two cylinder bores 7a are arranged in parallel or substantially in parallel in the vehicle widthwise direction in the cylinder block 7. Pistons 10 are inserted into the cylinder bores 7a. The pistons 10 reciprocate in the cylinder bores 7a. The pistons 10 are coupled to the crankshaft 2 through connecting rods 11.

The crankshaft 2 includes left and right crank pins 2a to which the connecting rods 11 are coupled. The crankshaft 2 includes a crank arm 2c that couples the left and right crank pins 2a and left and right crank journals 2b. The crankshaft 2 includes a crank web 2d that extends from the crank arm 2c to an opposite side of the crank pins 2a.

The left and right crank journals 2b are supported by a left wall 6c and a right wall 6d of the crank case 6L.

A generator 16 is attached to the right end of the crankshaft 2. The crankshaft 2 is provided with a starter gear 17 and a gear 18 on the left side of the generator 16. The gear 18 drives a balancer shaft.

The belt type continuously variable transmission 4 is arranged to couple the left end of the crankshaft 2 and the left end of the secondary shaft 3.

The belt type continuously variable transmission 4 is stored in a belt case 19 arranged separately from the crankcase 6L or the case 6M. The belt type continuously variable transmission 4 includes a driving pulley 21 and a driven pulley 22. The driving pulley 21 and the driven pulley 22 have a V-belt 23 wound around them. The belt case 19 has a two-part structure including a case 19a and a case 19b. The case 19a is fastened preferably by a bolt, for example, and fixed to the crankcase 6L.

Figure 6:
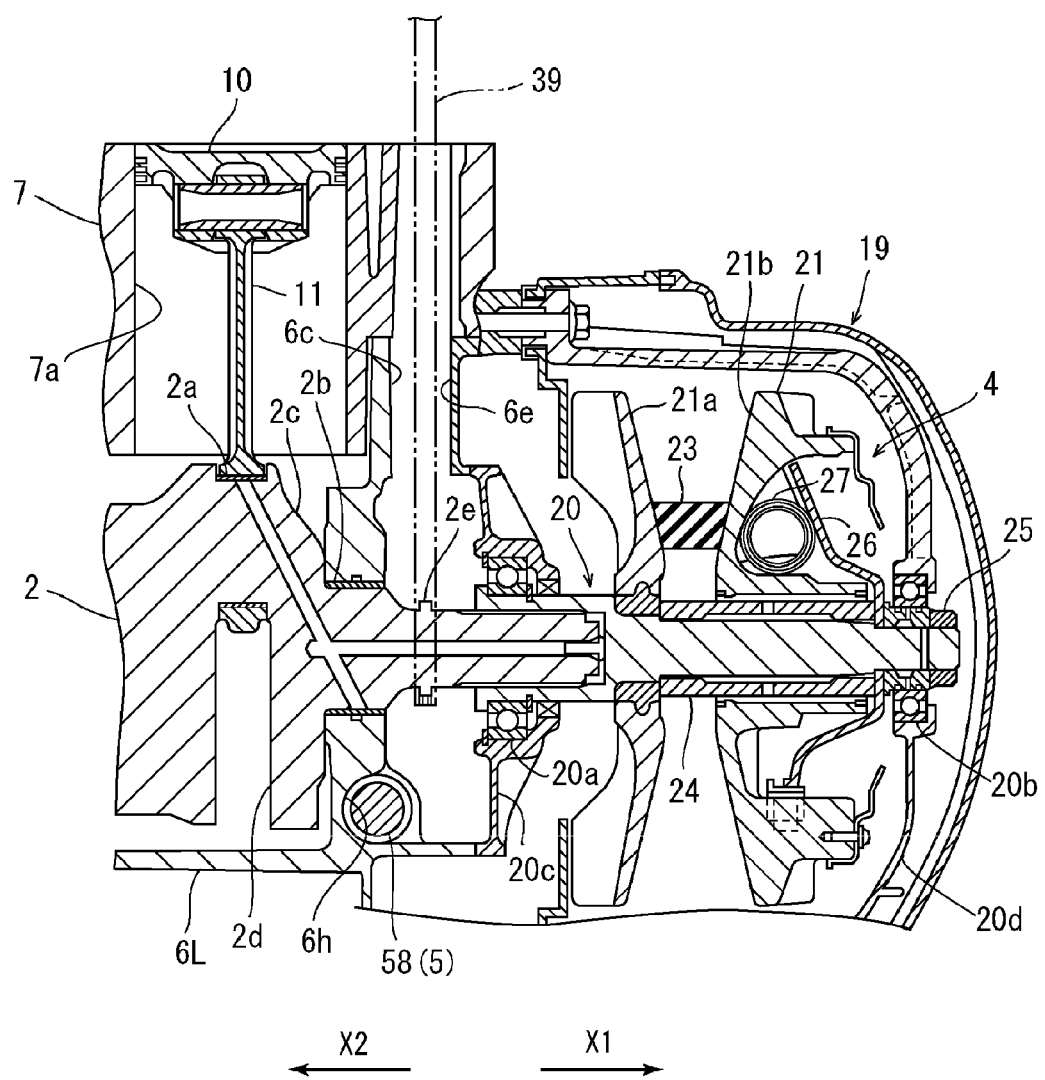
FIG. 6 is a sectional view showing a positional relation among a crank web, a driving pulley, and a drive shaft.

FIG. 6 is a sectional view showing a positional relation between the crank web 2d, the driving pulley 21, and the drive shaft 5. A primary shaft 20 is spline-coupled to the crankshaft 2. The driving pulley 21 is attached to the left end (end on the X1 side) of the primary shaft 20. The primary shaft is supported at a bearing cover 20c through a bearing 20a. The primary shaft 20 is supported at a bearing bracket 20d through a bearing 20b. The bearing cover 20c is attached detachably at the left wall 6c of the crankcase 6L.

The driving pulley 21 includes a fixed sheave 21a and a movable sheave 21b. The fixed sheave 21a is fixed to the primary shaft 20 preferably through a collar 24 by a lock nut 25, for example. The movable sheave 21b is attached so that it can move on the primary shaft 20 in the axial direction.

A weight 27 that moves the movable sheave 21b in the axial direction by centrifugal force is arranged between the movable sheave 21b and a cam plate 26 fixed to the primary shaft 20.

Referring back to FIG. 4, the driven pulley 22 is attached at the left end (the end on the X1 side) of the secondary shaft 3. The driven pulley 22 includes a fixed sheave 22a and a movable sheave 22b. The fixed sheave 22a is fixed at the secondary shaft 3 preferably by a lock nut 28, for example. The movable sheave 22b is attached so that it can move on the secondary shaft 3 in the axial direction. The movable sheave 22b receives pressure toward the side of the fixed sheave 22a (the X1 side) by a coil spring 29.

As shown in FIG. 4, a chain chamber 6e is provided between the crankcase 6L and the belt case 19. The chain chamber 6e stores a cam chain 39.

As shown in FIG. 3, the cam chain 39 is wound around a cam gear 2e and cam sprockets 40a and 41a. As shown in FIGS. 3 and 4, the cam gear 2e is formed at the crankshaft 2. The cam sprocket 40a is attached on an intake camshaft 40. The cam sprocket 41a is attached on an exhaust camshaft 41. The intake camshaft 40 drives an intake valve (not shown) to be open/closed. The exhaust camshaft 41 drives an exhaust valve (not shown) to be open/closed.

As shown in FIG. 4, the cam chain 39 is arranged between the crank web 2d positioned at the left end of the crankshaft 2 and the driving pulley 21. More specifically, the cam chain 39 is arranged near the left wall 6c of the crankcase 6L on the left side.

The secondary shaft 3 includes a multi-plate centrifugal clutch 30 at the right end (the end on the X2 side) opposite to the driven pulley 22. The centrifugal clutch 30 is arranged to overlap the generator 16 when seen in a front view, in other words, when seen from a position perpendicular or substantially perpendicular to the crankshaft. The centrifugal clutch 30 and the generator 16 are covered with a cover 31 attached to the transmission unit 6. The right end position of the generator 16 approximately matches the right end position of the centrifugal clutch 30.

Figure 7:
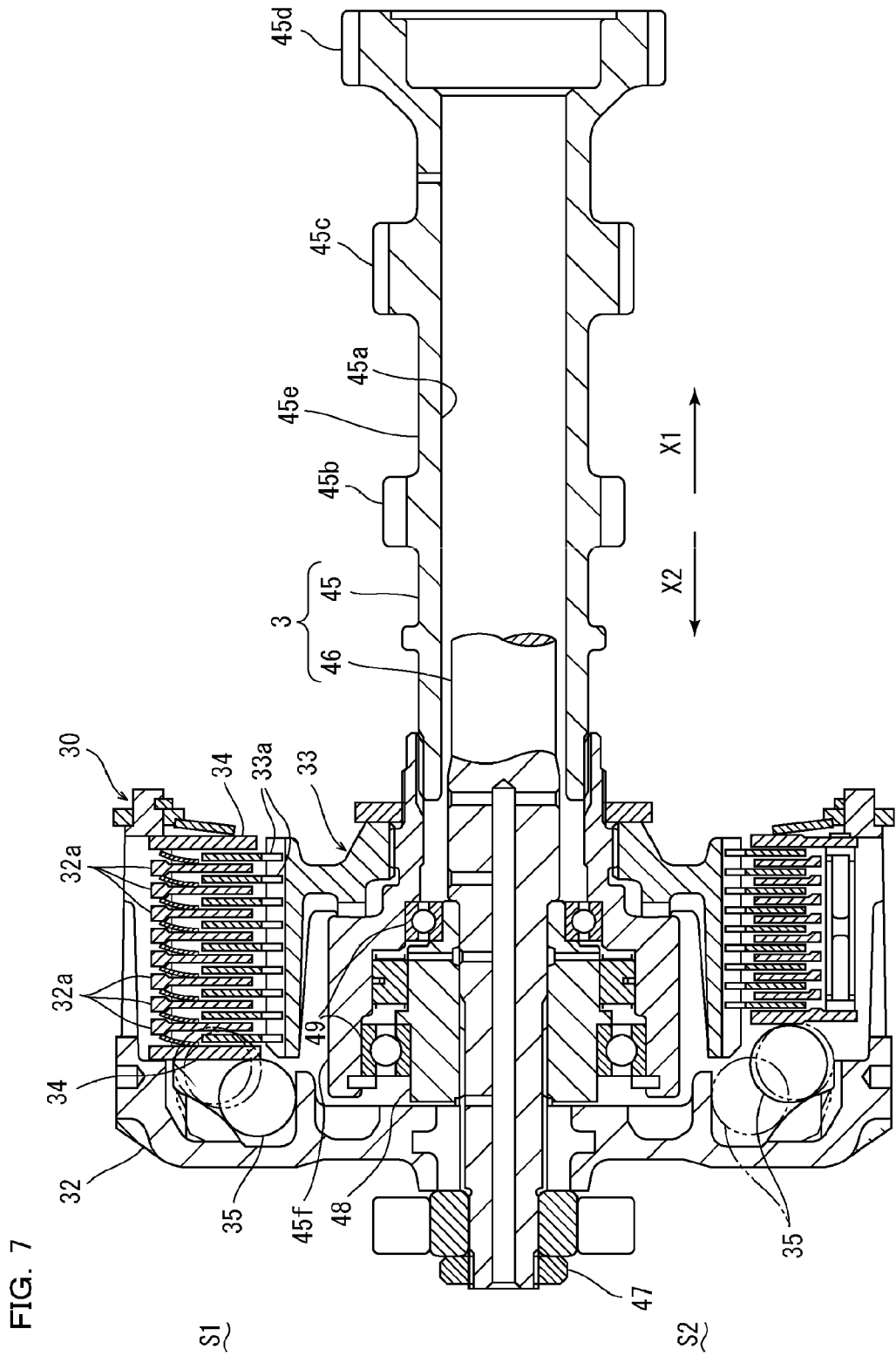
FIG. 7 is a sectional view of a secondary shaft and a centrifugal clutch.

FIG. 7 is a sectional view of the secondary shaft 3 and the centrifugal clutch 30. As shown in FIG. 7, the centrifugal clutch 30 includes an outer drum (input portion) 32 including a plurality of outer clutch plates 32a mounted thereto. The centrifugal clutch 30 includes an inner drum (output portion) 33 arranged in the outer drum 32. A plurality of inner clutch plates 33a arranged between the outer clutch plates 32a are mounted at the inner drum 33. The centrifugal clutch 30 includes a weight 35 that increases the contact pressure of the outer clutch plates 32a and the inner clutch plates 33a through a pressurizing plate 34 by centrifugal force generated by the rotation of the secondary shaft 3.

In FIG. 7, the centrifugal clutch 30 is in different states between on the S1 side and the S2 side for ease of illustration. The centrifugal clutch 30 on the S1 side is in a disengaged state. More specifically, there is a gap between the outer clutch plates 32a and the inner clutch plates 33a and rotation force is not transmitted. The centrifugal clutch 30 on the S2 side is in an engaged state. More specifically, the outer clutch plates 32a and the inner clutches 33a are in a contact state as the gap between them is narrowed, so that rotation force is transmitted.

The secondary shaft 3 includes an outer shaft 45 and an inner shaft 46. The inner shaft 46 is inserted in a relatively rotatable manner into a shaft hole 45a formed at the axial center of the outer shaft 45. The outer shaft 45 includes a reverse output gear 45b, a low output gear 45c, and a high output gear 45d that are integrally formed. The outer shaft 45 is supported around the inner shaft 46 through bearings 49.

As shown in FIG. 4, the driven pulley 22 is fixed at the left end of the inner shaft 46. An outer drum 32 is fixed at the right end of the inner shaft 46. The outer drum 32 is fixed preferably by a lock nut 47, for example.

Referring back to FIG. 7, the outer shaft 45 is axially divided into an output portion 45e having output gears 45b to 45d and a drum portion 45f connected with the inner drum 33 preferably by spline coupling, for example. The output portion 45e and the drum portion 45f preferably are spline-coupled, for example. The drum portion 45f is supported around the inner shaft 46 through a spacer 48 and the bearings 49.

As shown in FIG. 4, the output gear 13a is integrally formed with the shift shaft 13. A low gear 50 that can engage with the low output gear 45c is mounted at the shift shaft 13 in a relatively rotatable manner. A high gear 51 that can engage with the high output gear 45d is mounted at the shift shaft 13 in a relatively rotatable manner. A reverse gear 53 corresponding to the reverse output gear 45b is mounted at the shift shaft 13 in a relatively rotatable manner. The reverse output gear 45b and the reverse gear 53 are coupled by a chain 54.

Dog clutches 55 are mounted movably at the shift shaft 13 in the axial direction. The dog clutches 55 are moved to be engaged with any of the gears 50, 51 and 53, so that the gear 50, 51, or 53 are rendered effective. In this way, the engine revolution is switched to one of low, high, and reverse states and output from the output gear 13a. In the example shown in FIG. 4, the dog clutches 55 are placed in a neutral position.

An input gear 56 engaged with the output gear 13a is preferably spline-coupled to the right end of the output shaft 14. The rotation driving force of the shift shaft 13 is transmitted to the output shaft 14 through the output gear 13a and the input gear 56.

The output gear 14 includes an integrally formed bevel gear 14a at the left end. The drive shaft 5 has an integrally formed bevel gear 57a engaged with the bevel gear 14a. The rotation driving force of the output shaft 14 is transmitted to the drive shaft 5 through the bevel gear 14a and bevel gear 57a.

The drive shaft 5 is arranged in a direction that is perpendicular or substantially perpendicular to the shift shaft 13 and the output shaft 14, in other words, in the front-back direction of the vehicle. The drive shaft 5 includes a first drive shaft 57 and a second drive shaft 58. The front end 58a of the second drive shaft 58 is inserted in an axial center portion of the first drive shaft 57 and is preferably spline-connected, for example.

The first drive shaft 57 is supported at a support portion 6f arranged at the case 6M through bearings 60. The first drive shaft 57 is coupled with a front drive shaft 102 through a joint member 59. As shown in FIG. 1, the front drive shaft 102 is coupled to the left and right front wheels 101 through a front differential 103 (see FIG. 1).

The second drive shaft 58 extends toward the back of the vehicle coaxially to the first drive shaft 57. As shown in FIG. 5, the rear portion 58b of the second drive shaft 58 is supported at a shaft support portion 6g arranged at a rear end of the crankcase 6L. The rear portion 58b is coupled with the rear drive shaft 105 through a joint member 61 and the rear drive shaft 105 is coupled to the left and right rear wheels 104 through a rear differential 106 (see FIG. 1).

As shown in FIG. 6, the second drive shaft 58 is arranged under the cam chain 39. The second drive shaft 58 extends in the front-back direction of the vehicle. As shown in FIG. 5, the second drive shaft 58 is arranged in a shaft hole 6j formed at the case 6M and the crankcase 6L. As shown in FIG. 6, the second drive shaft 58 is arranged in a groove 6h formed at the lower end of the left side wall 6c of the crankcase 6L.

As shown in FIG. 5, a portion of the second drive shaft 58 positioned in the groove 6h is exposed to the outside (to the left side of the vehicle) when the bearing cover 20c is removed and overlaps the rotation trajectory C1 of the driving pulley 21 when seen in a side view. More specifically, a portion of the second drive shaft 58 positioned in the groove 6h is arranged to overlap the rotation trajectory C2 of the crank web 2d when seen in a side view. More specifically, the second drive shaft 58 is arranged under and in close proximity to the crankshaft 2.

As shown in FIG. 4, the engine 1 is arranged so that the vehicle body central line d is positioned between the cylinder central line b passing halfway between the cylinder axial lines aR and aL of cylinder bores 7a and the drive shaft line c of the second drive shaft 58. More specifically, the vehicle body central line d is positioned between the cylinder axial lines aR and aL and between the cylinder central line b and the cylinder axial line aL of the left cylinder bore. The second drive shaft 58 is positioned between a cam chain line e and the left cylinder axial line aL.

According to the present preferred embodiment, the cam chain 39 is arranged between the crank web 2d of the crankshaft 2 and the driving pulley 21 of the belt type continuously variable transmission 4. The second drive shaft 58 is arranged to pass under the cam chain 39 and partly overlap the rotation trajectory C1 of the driving pulley 21 when seen in a side view. Using the space formed under the cam chain 39, the second drive shaft 58 can be positioned in close proximity to the crankshaft 2. More specifically, the second drive shaft 58 can be arranged under the cam chain 39 in the space between the crank web 2d and the driving pulley 21. In this way, the sizes of the engine 1 and the transmission unit 6 in the vertical direction can be reduced. When a two-cylinder engine is arranged, the width of the crankcase is increased as compared to the case of providing a single cylinder engine. According to the present preferred embodiment, even when a two-cylinder engine is provided, the total size of the transmission unit can be prevented from increasing.

According to the present preferred embodiment, at least a portion of the second drive shaft 58 is positioned under the left crank journal 2b. Stated differently, the left crank journal 2b and a portion of the second drive shaft 58 are included in a plane that is perpendicular or substantially perpendicular to the crankshaft 2. A space near the bearing portion, having a smaller diameter, of the crankshaft is used effectively.

Furthermore, the second drive shaft 58 is arranged to pass under the cam chain 39 and overlap the rotation trajectory C2 of the crank web 2d when seen in a side view. The engine 1 and the transmission unit 6 can have reduced sizes in the vertical direction.

A wide space for the driver's seat can be secured in the four-wheel drive vehicle 100 by reducing the vertical sizes of the engine 1 and the transmission unit 6.

According to the present preferred embodiment, the centrifugal clutch 30 is preferably arranged at an end of the secondary shaft 3 opposite to the driven pulley 22. The secondary shaft 3 is arranged parallel or substantially parallel to the crankshaft 2. A belt type continuously variable transmission 4 and the centrifugal clutch 30 having a relatively large diameter can be arranged in a well-balanced manner on both sides in the direction of the crankshaft. The size of the crankcase 6L in the vehicle widthwise direction can be reduced, so that the vehicle can be reduced in weight.

Assume for example that a parallel two-cylinder engine is arranged in place of a single-cylinder engine in a vehicle. Assume that a crankshaft is arranged in the vehicle widthwise direction similarly to the preferred embodiment described above. In order to minimize changes in the body frame, the width and height of each of an engine, a crankcase, and a case must be prevented from increasing. According to the present preferred embodiment, the centrifugal clutch 30 is preferably arranged on the side of the secondary shaft 3 opposite to the belt type continuously variable transmission 4. The size of the crankcase in the vehicle widthwise direction can be reduced as compared to the conventional arrangement in which the centrifugal clutch is arranged between the crank web of the crankshaft and the belt type continuously variable transmission. Changes in the body frame necessary for arranging a parallel two-cylinder engine can be minimized.

According to the present preferred embodiment, the parallel two-cylinder engine 1 is preferably arranged so that the vehicle body central line d is positioned between the cylinder central line b and the drive shaft line c. As a result, the total weight of the vehicle can be reduced.

According to the present preferred embodiment, the secondary shaft 3 preferably includes the outer shaft 45 and the inner shaft 46. The outer shaft 45 preferably includes the output gears 45b to 45d at its outer circumference and is connected to the inner drum 33 of the centrifugal clutch 30. The inner shaft 46 is inserted in a relatively rotatable manner into a shaft hole 45a formed in the axial center of the outer shaft 45. A driven pulley 22 is arranged at one axial end of the inner shaft 46 and the outer drum 32 of the centrifugal clutch 30 is arranged at the other end. This makes it easier to assemble the driven pulley 22 and the centrifugal clutch 30 in to the secondary shaft 3. In this way, the outer shaft 45 and the inner shaft 46 can be produced easily.

According to the present preferred embodiment, the outer shaft 45 is preferably divided axially into the output portion 45e having the output gears 45b to 45d and the drum portion 45f connected with the inner drum 33. In this way, the outer shaft 45 can be produced more easily, and this can improve the assemblability.

Figure 8:
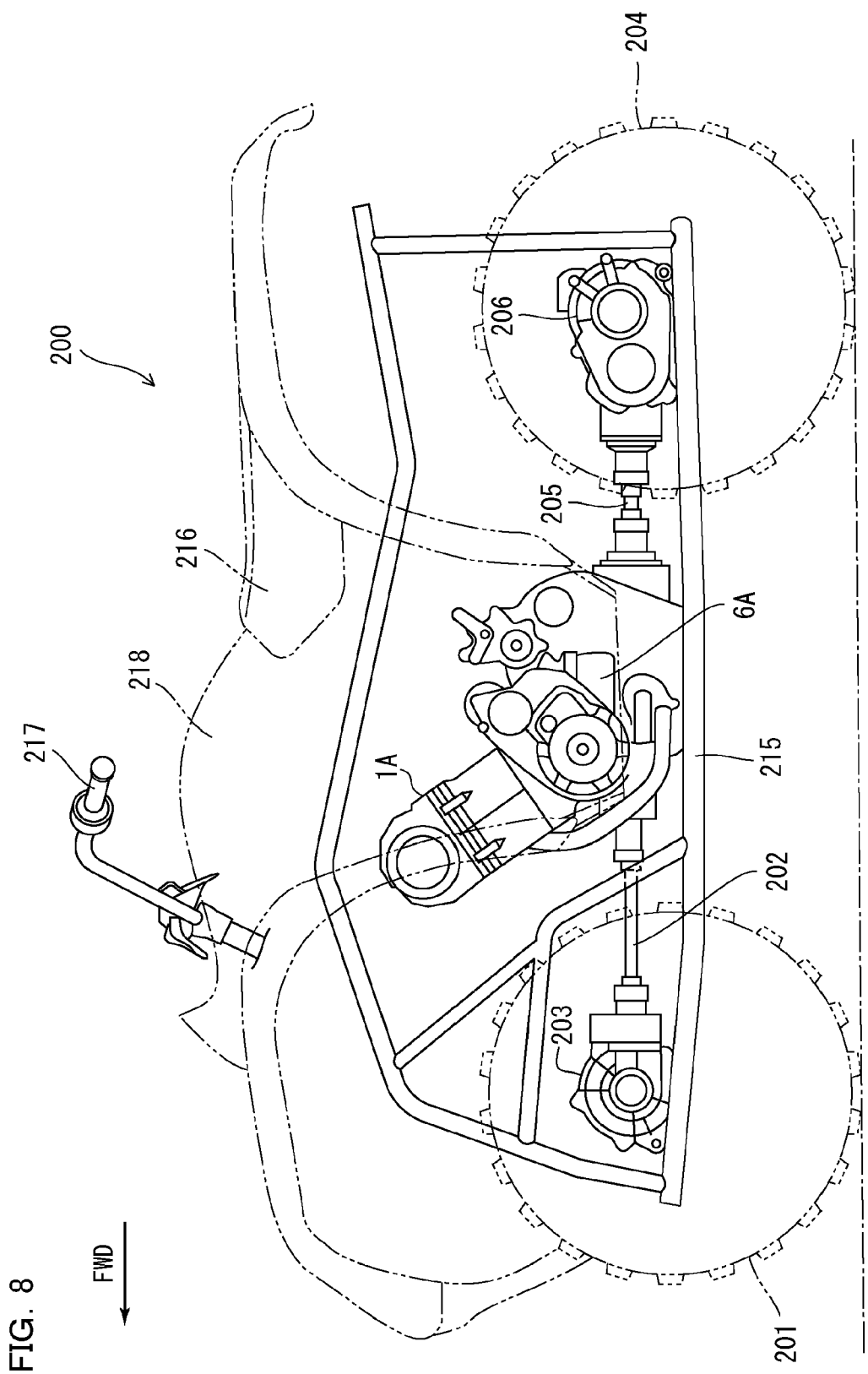
FIG. 8 is a left side view of a four-wheel drive vehicle according to another preferred embodiment of the invention.

FIG. 8 is a view of a four-wheel drive vehicle 200 according to another preferred embodiment of the invention. The four-wheel drive vehicle 200 preferably is a vehicle called ATV (All-Terrain Vehicle) for off road traveling. The four-wheel drive vehicle 200 is a straddle type vehicle.

The four-wheel drive vehicle 200 includes an engine 1A arranged near the center of the vehicle. A seat 216 is arranged above the engine 1A. A steering mechanism 217 is provided in front of the seat 216. A fuel tank 218 is arranged between the seat 216 and the steering mechanism 217.

A transmission unit 6A is arranged under the engine 1A. A front drive shaft 202 extends forward from the transmission unit 6A. The power of the engine 1A is transmitted to a front wheel 201 through the front drive shaft 202 and a front differential 203. A rear drive shaft 205 extends backward from the transmission unit 6A. The power of the engine 1A is transmitted to a rear wheel 204 through the rear drive shaft 205 and a rear differential 206.

The basic idea about the arrangement of the engine 1A and the transmission unit 6A is the same as that of the engine 1 and the transmission unit 6 according to the above-preferred embodiment described in conjunction with FIG. 1 or 2. However, as can be seen from the comparison between FIGS. 1 and 8, the engine 1A and the transmission unit 6A are symmetrical in the front-back direction with respect to the arrangement of the engine 1 and the transmission unit 6. In the four-wheel drive vehicle 200, the engine 1A is arranged inclined forward. The transmission unit 6A is arranged to extend toward the back under the engine 1A. More specifically, reversing the unit including the engine 1 and the transmission unit 6 in FIG. 1 in the front-back direction results in the arrangement of the engine 1A and the transmission unit 6A. Note that the front drive shaft and the rear drive shaft are connected reversely.

The arrangement of the drive shaft 5 in the four-wheel drive vehicle 200 is the same as that of the four-wheel drive vehicle 100. More specifically the arrangement includes all the aspects of the present invention described in conjunction with the above-preferred embodiment. In the four-wheel drive 200, the vertical size of the unit including the engine 1A and the transmission unit 6A can be reduced, so that the space of the driver's seat above the engine 1A can be very wide.

In the above-described preferred embodiment, while a parallel two-cylinder engine is preferably described as an example, the vehicle may have a V-type two-cylinder engine. With the V-type two-cylinder engine, the size of the crankcase in the vehicle widthwise direction can be even more reduced. The invention may be applied to a vehicle including a single cylinder engine. In this case, the cylinder axial line of the cylinder bore corresponds to the central line of the cylinder.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A four-wheel drive vehicle comprising:
   a two-cylinder engine;
   a front wheel arranged to rotate due to a driving force of the engine;
   a rear wheel arranged to rotate due to the driving force of the engine;
   a crankshaft arranged in a widthwise direction of the vehicle to receive the driving force of the engine;
   a secondary shaft arranged parallel or substantially parallel to the crankshaft;
   a belt continuously variable transmission arranged to couple a first axial end of the crankshaft and a first axial end of the secondary shaft and to transmit a rotation of the crankshaft to the secondary shaft;
   a cam chain arranged between a crank web of the crankshaft and the belt continuously variable transmission; and
   a drive shaft arranged under the cam chain and at least partly overlapping a pulley in the continuously variable transmission when seen in an axial direction of the crankshaft to transmit rotation of the secondary shaft to the front wheel and the rear wheel.

2. The four-wheel drive vehicle according to claim 1, wherein the pulley includes a driving pulley arranged at the first axial end of the crankshaft.

3. The four-wheel drive vehicle according to claim 1, wherein at least a portion of the drive shaft and a bearing portion of the crankshaft are included in a plane that is perpendicular or substantially perpendicular to the crankshaft.

4. The four-wheel drive vehicle according to claim 1, wherein the drive shaft is arranged to at least partly overlap the rotation trajectory of the crank web when seen in the axial direction of the crankshaft.

5. The four-wheel drive vehicle according to claim 1, wherein a central line of the vehicle body is positioned between a central position between the two cylinders of the engine and an axial line of the drive shaft.

6. The four-wheel drive vehicle according to claim 5, wherein the engine is a parallel two-cylinder engine and the two cylinders are arranged in parallel or substantially in parallel in the axial direction of the crankshaft.

7. The four-wheel drive vehicle according to claim 1, further comprising a centrifugal clutch arranged at a second axial end of the secondary shaft on a side opposite to the belt continuously variable transmission.

8. The four-wheel drive vehicle according to claim 7, wherein the secondary shaft includes an outer shaft including an output gear, the secondary shaft being connected with an output portion of the centrifugal clutch; and
   an inner shaft inserted into the outer shaft so as to rotate relative thereto, the inner shaft connected with a driven pulley of the belt continuously variable transmission at a first end and with an input portion of the centrifugal clutch at a second end.

9. The four-wheel drive vehicle according to claim 8, wherein a portion of the outer shaft including the output gear and a portion of the outer shaft connected with the output portion of the centrifugal clutch are separated in the axial direction.

* * * * *